(12) United States Patent
Mou et al.

(10) Patent No.: US 11,519,627 B2
(45) Date of Patent: Dec. 6, 2022

(54) AIR QUALITY SYSTEM HANDLED BY ARTIFICIAL INTELLIGENCE INTERNET OF THINGS

(71) Applicant: MICROJET TECHNOLOGY CO., LTD., Hsinchu (TW)

(72) Inventors: Hao-Jan Mou, Hsinchu (TW); Yung-Lung Han, Hsinchu (TW); Chi-Feng Huang, Hsinchu (TW); Wei-Ming Lee, Hsinchu (TW); Chun-Yi Kuo, Hsinchu (TW); Tsung-I Lin, Hsinchu (TW); Chang-Yen Tsai, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 145 days.

(21) Appl. No.: 17/012,155

(22) Filed: Sep. 4, 2020

(65) Prior Publication Data
US 2021/0095879 A1 Apr. 1, 2021

(30) Foreign Application Priority Data
Sep. 27, 2019 (TW) .................................. 108135356

(51) Int. Cl.
| | | |
|---|---|---|
| *F24F 11/58* | (2018.01) | |
| *F24F 11/63* | (2018.01) | |
| *F24F 11/32* | (2018.01) | |
| *F24F 11/89* | (2018.01) | |
| *F24F 13/32* | (2006.01) | |
(Continued)

(52) U.S. Cl.
CPC ............ *F24F 11/58* (2018.01); *F04B 43/046* (2013.01); *F24F 11/32* (2018.01); *F24F 11/63* (2018.01); *F24F 11/89* (2018.01); *F24F 13/32* (2013.01); *F24F 2110/64* (2018.01); *F24F 2110/66* (2018.01); *F24F 2110/70* (2018.01); *F24F 2110/72* (2018.01); *F24F 2110/74* (2018.01)

(58) Field of Classification Search
CPC .............. F24F 2110/66; F24F 2110/64; F24F 2110/72; F24F 2110/74
See application file for complete search history.

(56) References Cited

U.S. PATENT DOCUMENTS

| | | | |
|---|---|---|---|
| 2018/0291832 A1* | 10/2018 | Whitney | .............. G07C 5/0808 |
| 2019/0201594 A1* | 7/2019 | Shelton, IV | ........... G16H 10/60 |

(Continued)

FOREIGN PATENT DOCUMENTS

| | | |
|---|---|---|
| CN | 210769266 U | 6/2020 |

*Primary Examiner* — Nathan L Laughlin
(74) *Attorney, Agent, or Firm* — McClure, Qualey & Rodack, LLP (57) ABSTRACT

An air quality system handled by artificial intelligence internet of things is provided and includes a gas detection device, an artificial intelligent internet of things handling device, and a user demand platform. In the system, the user demand platform transmits an instruction to the artificial intelligent internet of things handling device. By using self deep-learning analysis of data computing and algorithms of the AI device, second digital data is generated. The second digital data is fed back to the gas detection device through the network. Accordingly, the actuating actions of the micro pumps and the detecting actions of the sensors can be generated. Hence, the actuation and the detection of air quality can be achieved more effectively.

16 Claims, 8 Drawing Sheets

(51) Int. Cl.
*F04B 43/04* (2006.01)
*F24F 110/66* (2018.01)
*F24F 110/72* (2018.01)
*F24F 110/70* (2018.01)
*F24F 110/74* (2018.01)
*F24F 110/64* (2018.01)

(56) References Cited

U.S. PATENT DOCUMENTS

2020/0400631 A1* 12/2020 Gao .................. G06N 3/084
2021/0239667 A1* 8/2021 Gentner ............... G01N 21/274

* cited by examiner

AIR QUALITY SYSTEM HANDLED BY ARTIFICIAL INTELLIGENCE INTERNET OF THINGS

CROSS-REFERENCE TO RELATED APPLICATION

This non-provisional application claims priority under 35 U.S.C. § 119(a) to Patent Application No. 108,135,356 filed in Taiwan, R.O.C. on Sep. 27, 2019, the entire contents of which are hereby incorporated by reference.

BACKGROUND

Technical Field

The present disclosure relates to a gas detection system. In particular, to an air quality system handled by artificial intelligence (AI) internet of things (IoT).

Related Art

At present where industries are highly developed, people pay more and more attention to the detection of gases, such as carbon monoxide, carbon dioxide, volatile organic compounds (VOC), PM10, PM2.5, etc., which can cause adverse health effects on the human body and can even be life-threatening. Therefore, gas detection becomes an important issue for the public.

Currently, the detection of market available gas detection apparatuses is achieved by sensors, so that the sensors obtain information and data related to the gas. However, for performing the detections at different environments, the sensors cannot be adjusted and calibrated timely and accurately. As a result, the detection efficiency is poor as well as the detection accuracy is not good.

In view of these, how to develop an air quality system handled by artificial intelligence (AI) internet of things (IoT) so as to perform adjustments and calibrations for the detections at different environments in a timely and accurate manner is an issue for the gas detection fields.

SUMMARY

One object of the present disclosure is providing an air quality system handled by artificial intelligence internet of things. The air quality information required by the user is obtained by transmitting a digital instruction to the artificial intelligence (AI) internet of things (IoT) handling device through the user demand platform. By using self deep-learning analysis of data computing and algorithms of the AI device, different and new digital data is generated. The digital data is fed back to the plurality of micro pumps of the gas detection device through the network. Accordingly, the actuating actions of the plurality of micro pumps and the detecting actions of the plurality of sensors can be generated. Hence, the actuation and the detection of air quality can be achieved more effectively, thereby satisfying users' requirements.

To achieve the above mentioned purpose(s), a general embodiment of the present disclosure provides an air quality system handled by artificial intelligence (AI) internet of things (IoT) including a gas detection device, an AI IoT handling device, and a user demand platform. The gas detection device is formed by arranging a plurality of micro pumps and a plurality of sensors with each other. Each of the micro pumps controls and guides a gas to pass through the corresponding sensor to perform a detection to the gas so as to obtain a first digital data. The gas detection device transmits out the plurality of first digital data through a network. The AI IoT handling device receives and stores the plurality of first digital data transmitted by the gas detection device. By an AI device, the AI IoT handling device performs self-learning analysis to the plurality of first digital data to generate a plurality of second digital data, and the plurality of second digital data is fed back to the gas detection device through the network so as to generate actuating actions of the plurality of micro pumps and detecting actions of the plurality of sensors, by which the plurality of first digital data and the plurality of second digital data are continuously transmitted through the network and such process repeats in cycles. The user demand platform is connected to the AI IoT handling device through the network. The user demand platform transmits a digital instruction requiring air quality information to the AI IoT handling device. The AI IoT handling device generates the plurality of second digital data by using self deep-learning analysis of data computing and algorithms of the AI device. The plurality of second digital data is fed back to the gas detection device through the network, so that the plurality of micro pumps performs the actuating actions and the plurality of sensors performs the detecting actions.

BRIEF DESCRIPTION OF THE DRAWINGS

The disclosure will become more fully understood from the detailed description given herein below for illustration only, and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1:
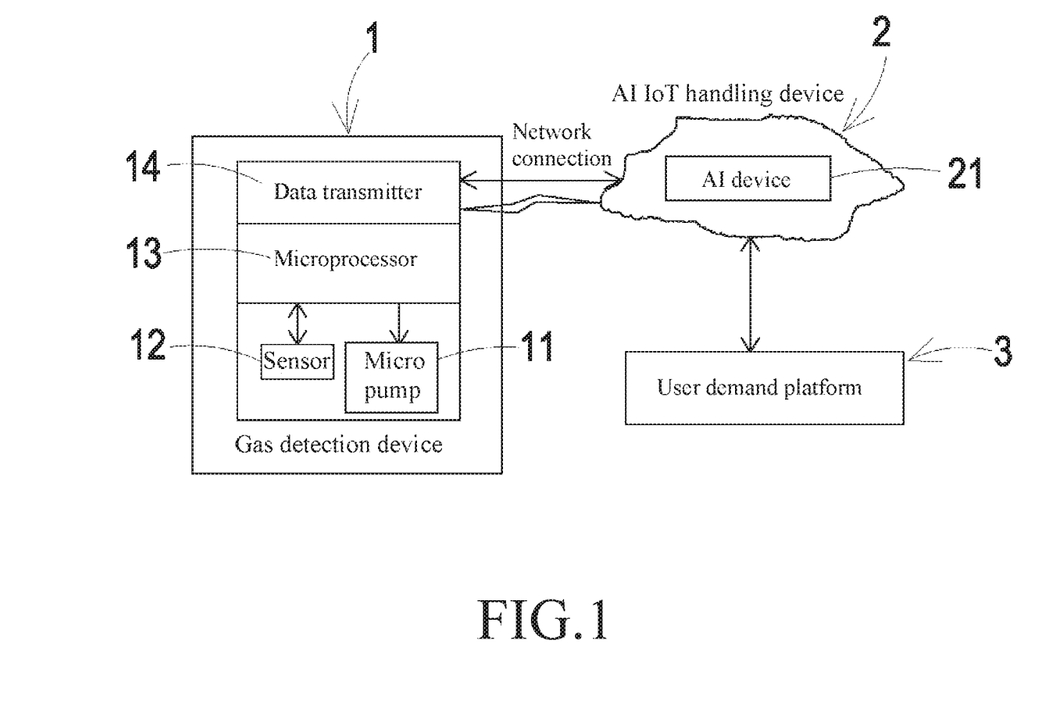
FIG. 1 illustrates a block diagram of an air quality system handled by artificial intelligence internet of things according to an exemplary embodiment of the present disclosure.
Figure 2:
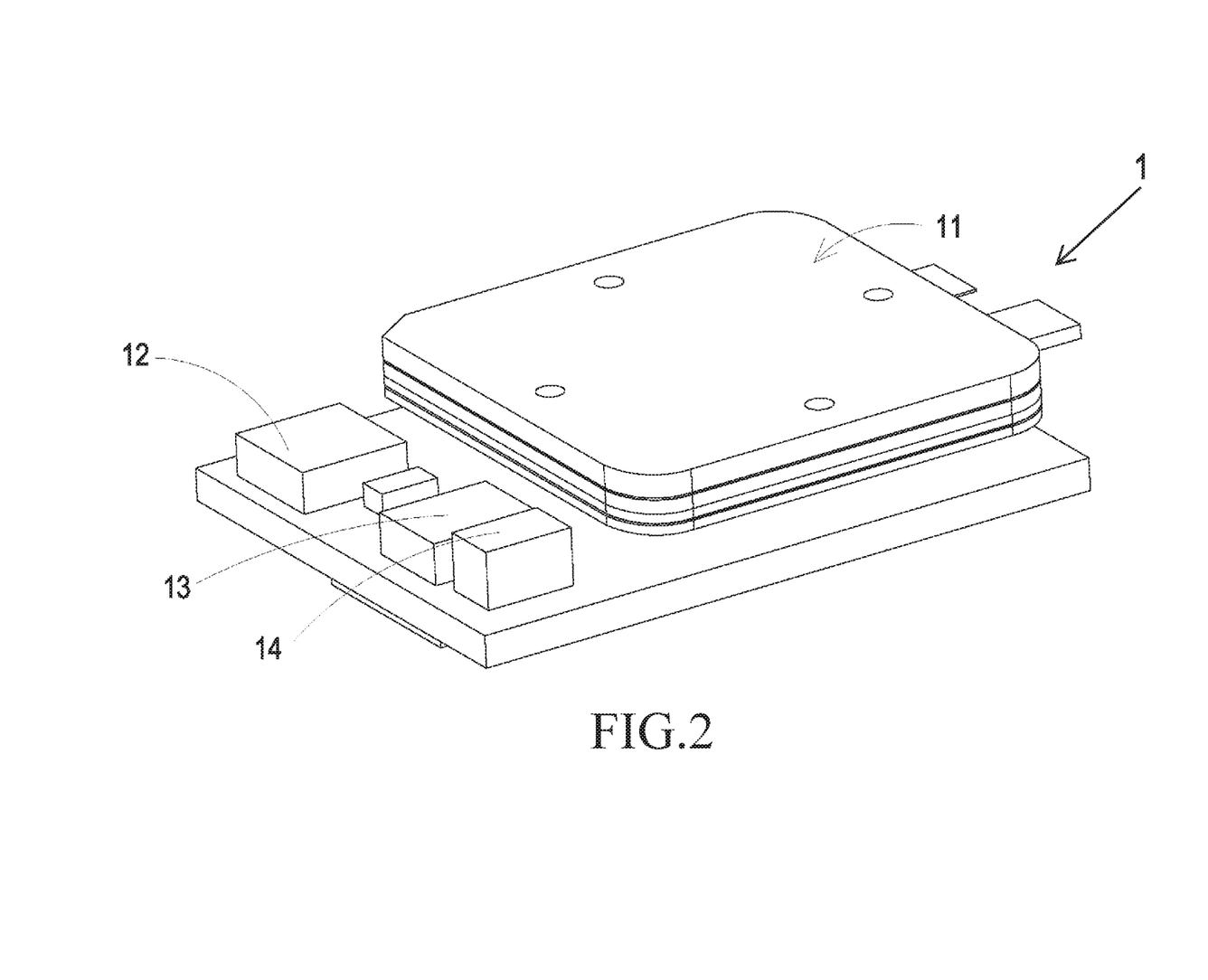
FIG. 2 illustrates a schematic view showing the correspondence between a single micro pump and a single sensor of the gas detection device according to an exemplary embodiment of the present disclosure.

Please refer to FIG. 1. The air quality system handled by artificial intelligence (AI) internet of things (IoT) of this embodiment mainly includes a gas detection device 1, an AI IoT handling device 2, and a user demand platform 3. The gas detection device 1 is disposed in a plurality of gas channels (not shown), and the gas detection device 1 is formed by arranging a plurality of micro pumps 11 and a plurality of sensors 12 with each other. Each of the micro pumps 11 controls and guides the gas to pass through the corresponding sensor 12 to perform a detection to the gas so as to obtain a first digital data. The micro pumps 11 may be arranged with each other in a parallel connection, in a series connection, or in a parallel-series connection. Each of the sensors 12 is disposed adjacent to the corresponding micro pump 11 (as shown in FIG. 2). Therefore, the gas detection device 1 can perform the detection through the sensors 12 to generate different first digital data. Moreover, the gas detection device 1 further comprises a microprocessor 13 and a data transmitter 14. The microprocessor 13 controls actuating operations of the micro pumps 11 and the sensors 12. The microprocessor 13 computes and converts a gas detection value sensed by the sensors 12 into the plurality of first digital data and outputs the plurality of first digital data, and then the microprocessor 13 transmits the plurality of first digital data to the data transmitter 14, so that the plurality of first digital data is packeted by the data transmitter 14 and is transmitted out to the AI IoT handling device 2 through the network. The AI IoT handling device 2 stores and performs intelligent analysis to the plurality of first digital data. The network may be a wired network or a wireless network.

The AI IoT handling device 2 receives and stores the plurality of first digital data transmitted by the gas detection device 1. By using an AI device 21, self-learning analysis is performed to the plurality of first digital data to generate a plurality of second digital data, and the plurality of second digital data is fed back to the micro pumps 11 and the sensors 12 of the gas detection device 1 through the network so as to generate actuating actions of the micro pumps 11 and detecting actions of the sensors 12, by which the plurality of first digital data and the plurality of second digital data are continuously transmitted through the network and such process repeats in cycles. By using the AI IoT handling device 2 to output the plurality of second digital data being analyzed, the operation of the gas detection device 1 can be adjusted and calibrated upon applying to different environments in a timely and accurate manner, thereby improving the air quality detection efficiency.

The user demand platform 3 is connected to the AI IoT handling device 2 through the network. The user demand platform 3 transmits a digital instruction requiring air quality information to the AI IoT handling device 2. The AI IoT handling device 2 generates the plurality of second digital data by using self deep-learning analysis of data computing and algorithms of the AI device 21. Then, the plurality of second digital data is fed back to the gas detection device 1 through the network, so that the micro pumps 11 perform the actuating actions and the sensors 12 perform the detecting actions. In other words, the AI device 21 generates the plurality of second digital data and the plurality of second digital data is fed back to the sensors 12 of the gas detection device 1 through the network, so that the actuating operations of the micro pumps 11 in the gas channels can be controlled and the detecting actuations of the sensors 12 can be performed. Hence, the actuation and the detection of the air quality can be achieved more effectively, thereby satisfying users' requirements.

Figure 3A:
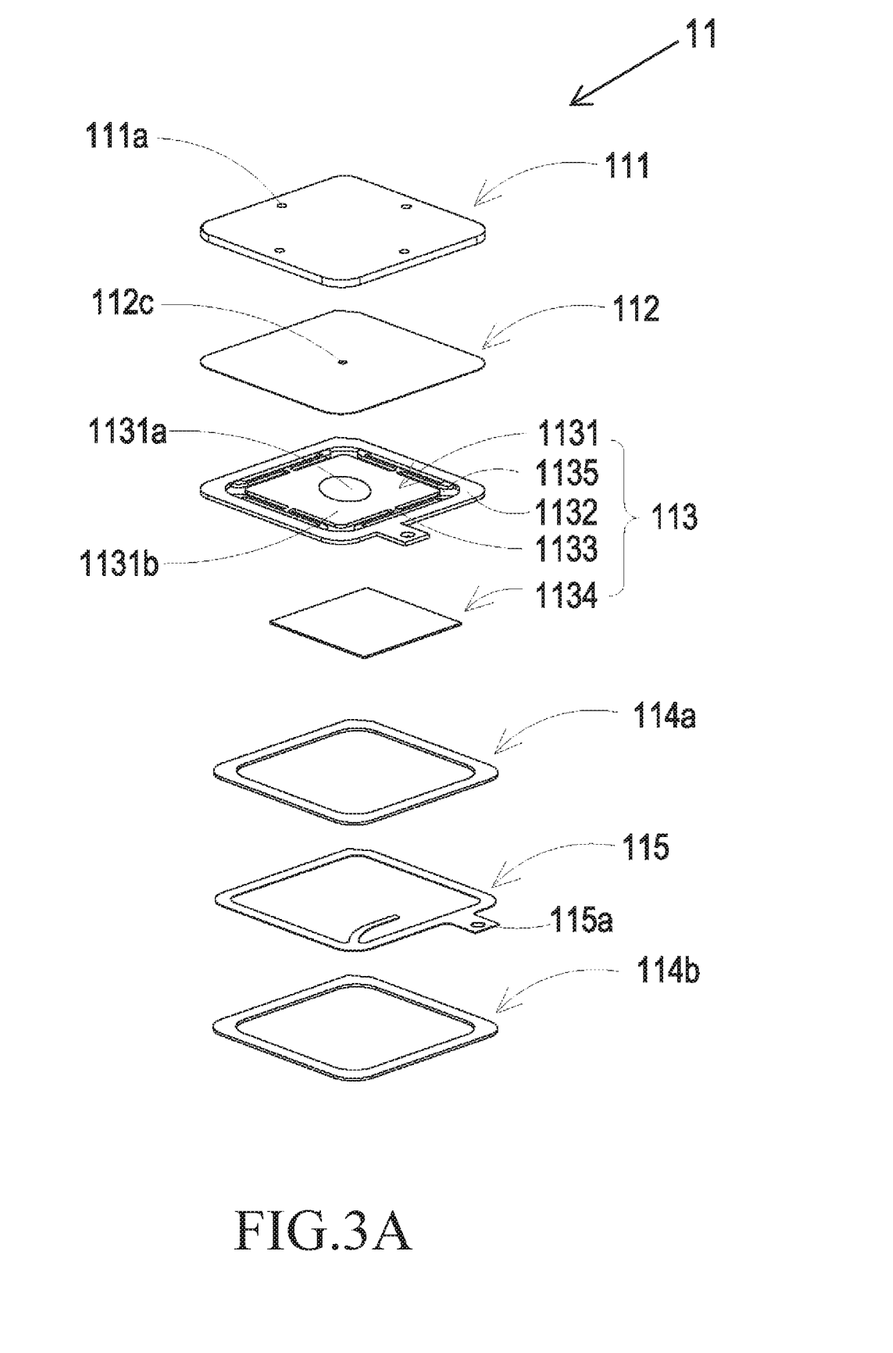
FIG. 3A and FIG. 3B respectively illustrate a front exploded view and a rear exploded view of a micro pump according to an exemplary embodiment of the present disclosure.
Figure 3B:
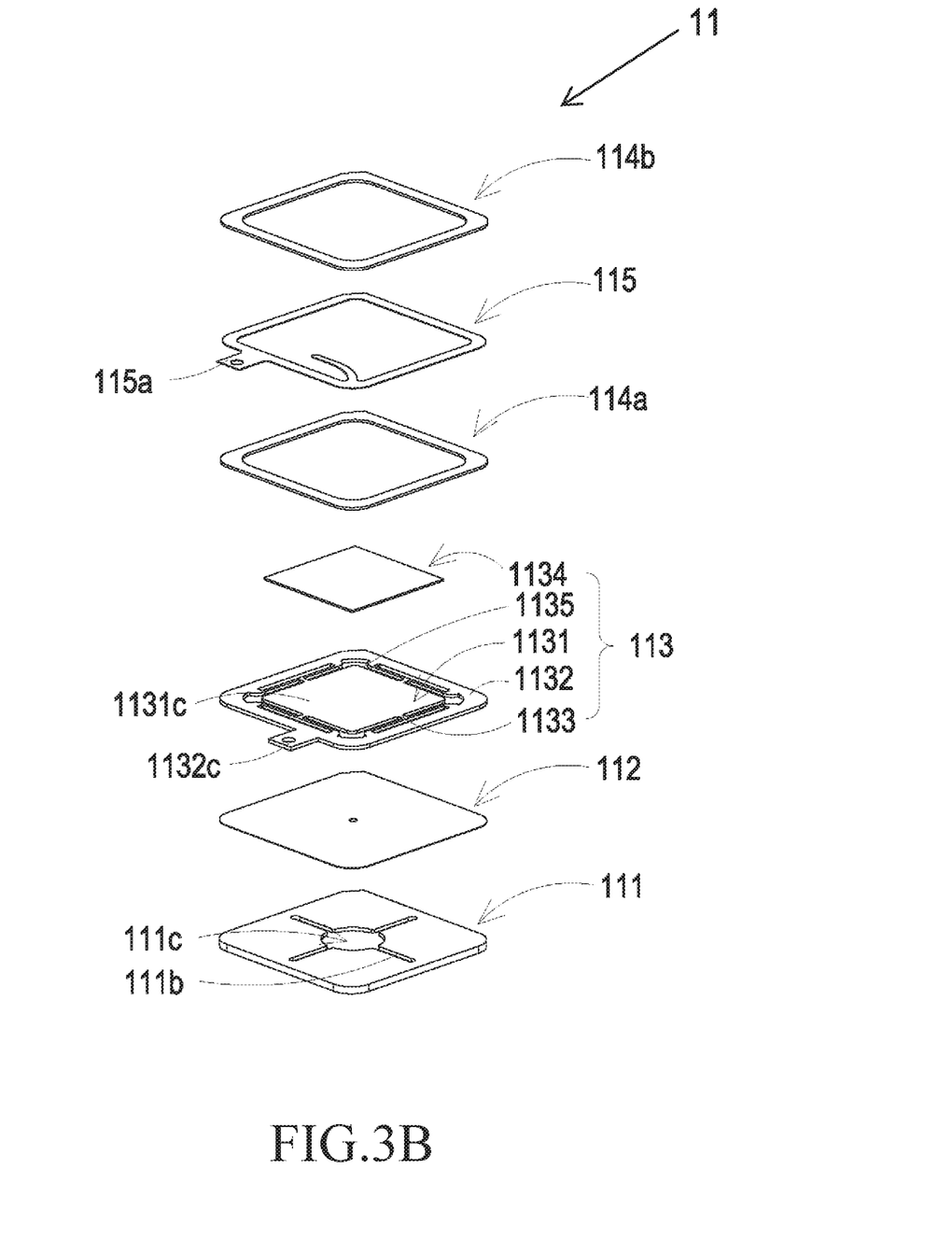

Please refer to FIG. 3A and FIG. 3B. In this embodiment, the micro pump 11 may be a micro-electromechanical systems (MEMS) pump or a piezoelectric pump. The following paragraphs describe the structure of the piezoelectric pump according to an embodiment of the present disclosure.

Figure 5:
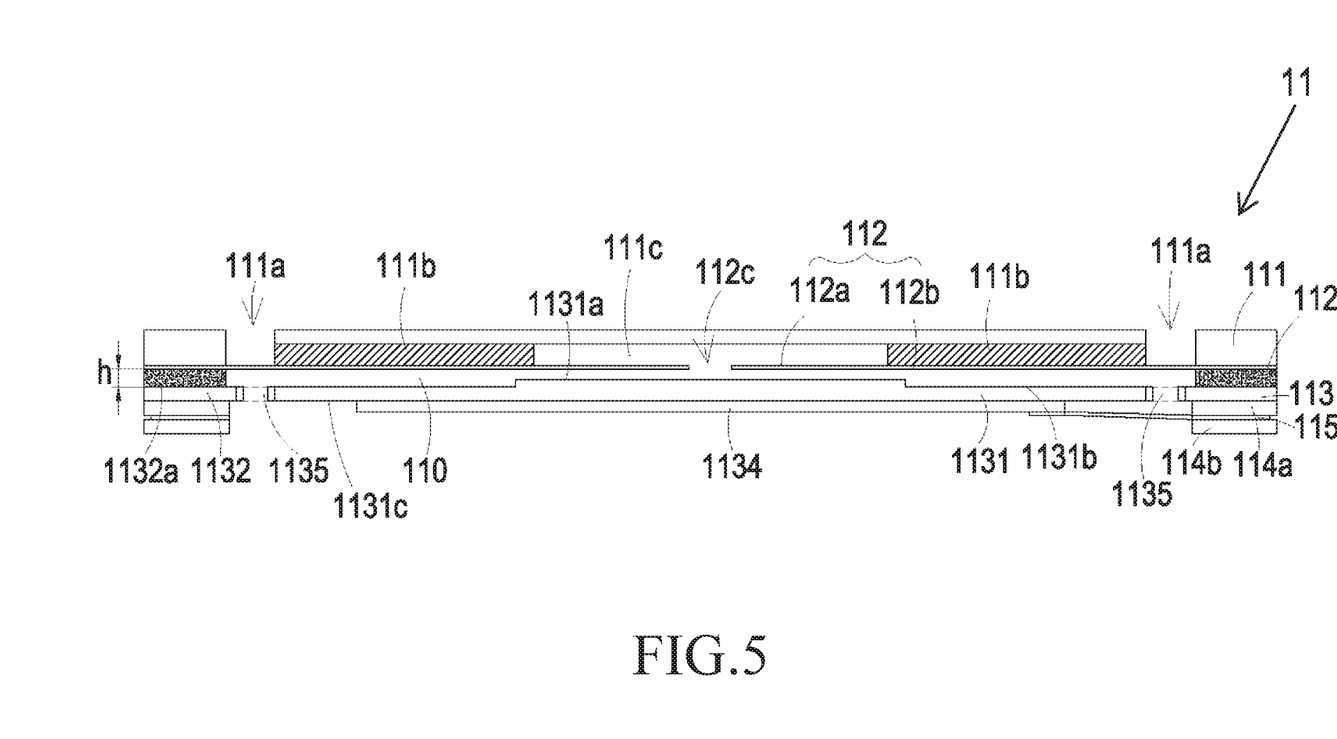
FIG. 5 illustrates a schematic cross-sectional view of the micro pump according to an exemplary embodiment of the present disclosure.

The micro pump 11 includes an inlet plate 111, a resonance sheet 112, a piezoelectric actuator 113, a first insulation sheet 114a, a conductive sheet 115, and a second insulation sheet 114b. The piezoelectric actuator 113 is disposed correspondingly to the resonance sheet 112. The inlet plate 111, the resonance sheet 112, the piezoelectric actuator 113, the first insulation sheet 114a, the conductive sheet 115, and the second insulation sheet 114b are sequentially stacked and assembled with each other. The cross-sectional view of the assembled structure of the micro pump 11 is shown in FIG. 5.

In this embodiment, the inlet plate 111 has at least one inlet hole 111a. The number of the inlet hole 111a is preferably four, but not limited thereto. The inlet plate 111 has a top surface and a bottom surface opposite to the top surface, and the inlet hole 111a penetrates the inlet plate 111 from the top surface to the bottom surface, so that the gas outside the micro pump 11 can flow into the micro pump 11 from the at least one inlet hole 111a due to the atmospheric pressure effect. The inlet plate 111 has at least one convergence channel 111b in communication with the at least one inlet hole 111a on the opposite side of the inlet plate 111. The convergence place of the convergence channels 111b has a central recess 111c, and the central recess 111c is in communication with the convergence channels 111b. Thus, the gas entering into the inlet plate 111 from the at least one inlet hole 111a can be guided and converged at the central recess 111c, thereby achieving gas transmission. In this embodiment, the inlet plate 111 is a one-piece element integrally formed with the inlet hole 111a, the convergence channel 111b, and the central recess 111c. The central recess 111c forms a convergence chamber for converging gas so as to store the gas temporarily. In some embodiments, the inlet plate 111 is made of stainless steel, but is not limited thereto. In some other embodiments, the depth of the convergence chamber formed by the central recess 111c is substantially equal to the depth of the convergence channel 111b, but is not limited thereto. The resonance sheet 112 is made of a flexible material, but is not limited thereto. Moreover, the resonance sheet 112 has a perforation 112c corresponding to the central recess 111c of the inlet plate 111, whereby the gas in the convergence chamber can pass through the resonance sheet 112. In some other embodiments, the resonance sheet 112 is made of copper, but is not limited thereto.

Figure 4:
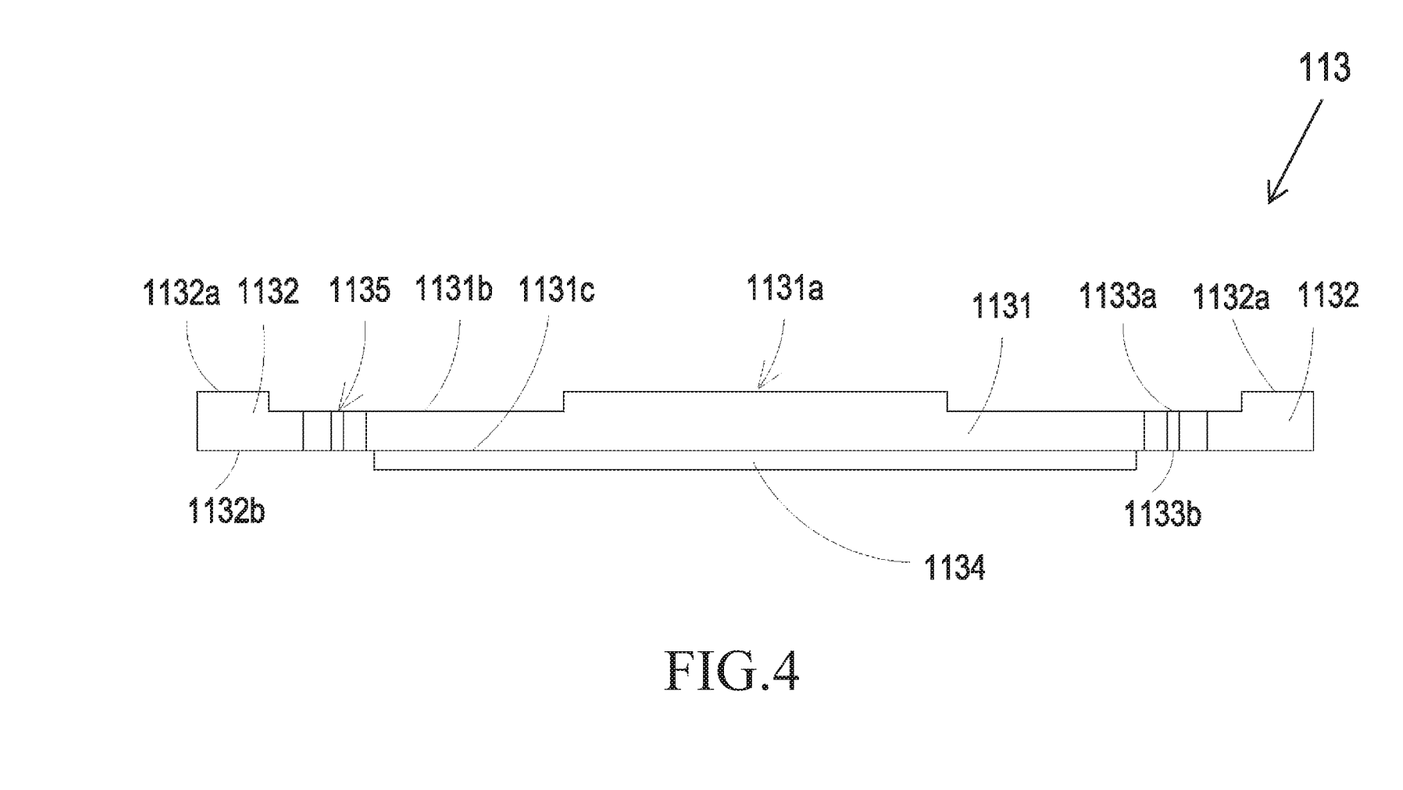
FIG. 4 illustrates a schematic cross-sectional view of a piezoelectric actuator shown in FIGS. 3A and 3B.

Please further refer to FIG. 4. In this embodiment, the piezoelectric actuator 113 is assembled by a suspension plate 1131, an outer frame 1132, at least one supporting element 1133, and a piezoelectric sheet 1134. The piezoelectric sheet 1134 is attached to a second surface 1131c of the suspension plate 1131 so as to drive the suspension plate 1131 to bend and vibrate when the piezoelectric sheet 1134 is applied with a voltage. In this embodiment, the at least one supporting element 1133 is connected between the suspension plate 1131 and the outer frame 1132. Two ends of the at least one supporting element 1133 are respectively connected to the outer frame 1132 and the suspension plate 1131, thereby providing a flexible support for the suspension plate 1131. At least one gap 1135 is formed among the at least one supporting element 1133, the suspension plate 1131, and the outer frame 1132. The at least one gap 1135 is in communication with a gas pathway, so that the gas can be discharged out from the micro pump 11 through the at least one gap 1135 and can be transmitted to the sensor 12. Moreover, the outer frame 1132 is disposed around the periphery of the suspension plate 1131, and the outer frame 1132 has a conductive pin 1132c extending outwardly for electrical connection, but is not limited thereto.

The suspension plate 1131 has a stepped structure. That is, the first surface 1131b of the suspension plate 1131 further has a protruding portion 1131a. The protruding portion 1131a may be a circular protruding structure, but is not limited thereto. The protruding portion 1131a of the suspension plate 1131 and the first surface 1132a of the outer frame 1132 are coplanar. The first surface 1131b of the suspension plate 1131 and the first surface 1133a of the supporting element 1133 are coplanar as well. Thus, there is a depth (a height difference) between the protruding portion 1131a of the suspension plate 1131 (the first surface 1132a of the outer frame 1132) and the first surface 1131b of the suspension plate 1131 (the first surface 1133a of the supporting element 1133). The second surface 1131c of the suspension plate 1131, the second surface 1132b of the outer frame 1132, and the second surface 1133b of the supporting element 1133 form a flat coplanar structure. The piezoelectric sheet 1134 is attached to the second surface 1131c of the suspension plate 1131. In this embodiment, the side length of piezoelectric sheet 1134 is shorter than the side length of the suspension plate 1131.

In this embodiment, as shown in FIG. 3A, the first insulation sheet 114a, the conductive sheet 115, and the second insulation sheet 114b of the micro pump 11 are sequentially disposed under the piezoelectric actuator 113. The shapes of these elements also substantially correspond to the shape of the outer frame 1132 of the piezoelectric actuator 113. In some embodiments, the first insulation sheet 114a and the second insulation sheet 114b are made of an insulation material (such as plastic, but not limited thereto) so as to provide insulation effect. In this embodiment, the conductive sheet 115 is made of, for example but not limited to, a conductive material so as to provide electrical conduction effect. In this embodiment, the conductive sheet 115 can also has a conductive pin 115a so as to achieve electrical conduction effect.

Further, in this embodiment, as shown in FIG. 5, the inlet plate 111, the resonance sheet 112, the piezoelectric actuator 113, the first insulation sheet 114a, the conductive sheet 115, and the second insulation sheet 114b are sequentially stacked with each other to form the micro pump 11. Since a space h is between the resonance sheet 112 and the piezoelectric actuator 113, and a filling material for example but not limited to, a conductive adhesive is applied to the space h between the resonance sheet 112 and the periphery of the outer frame 1132 of the piezoelectric actuator 113, a certain depth can be maintained between the resonance sheet 112 and the protruding portion 1131a of the suspension plate 1131 of the piezoelectric actuator 113, whereby the gas can be guided to flow more quickly. Moreover, since a proper distance is kept between the protruding portion 1131a of the suspension plate 1131 and the resonance sheet 112, the contact possibility between these components is decreased, and thus the noise can be reduced as well.

Please further refer to FIG. 3A, FIG. 3B, and FIG. 5. In this embodiment, after the inlet plate 111, the resonance sheet 112, and the piezoelectric actuator 113 are sequentially stacked and assembled with each other, the resonance sheet 112 has a movable portion 112a and a fixed portion 112b. The movable portion 112a and the inlet plate 111 above the movable portion 112a together form a chamber for converging the gas. A first chamber 110 is further formed between the resonance sheet 112 and the piezoelectric actuator 113 for temporarily storing the gas. The first chamber 110 is in communication with the chamber formed by the central recess 111c of the inlet plate 111 through the perforation 112c of the resonance sheet 112. The two sides of the first chamber 110 are in communication with the gaps 1135 between the supporting elements 1133 of the piezoelectric actuator 113, so that the first chamber 110 is in communication with the gas pathway.

Figure 6A:
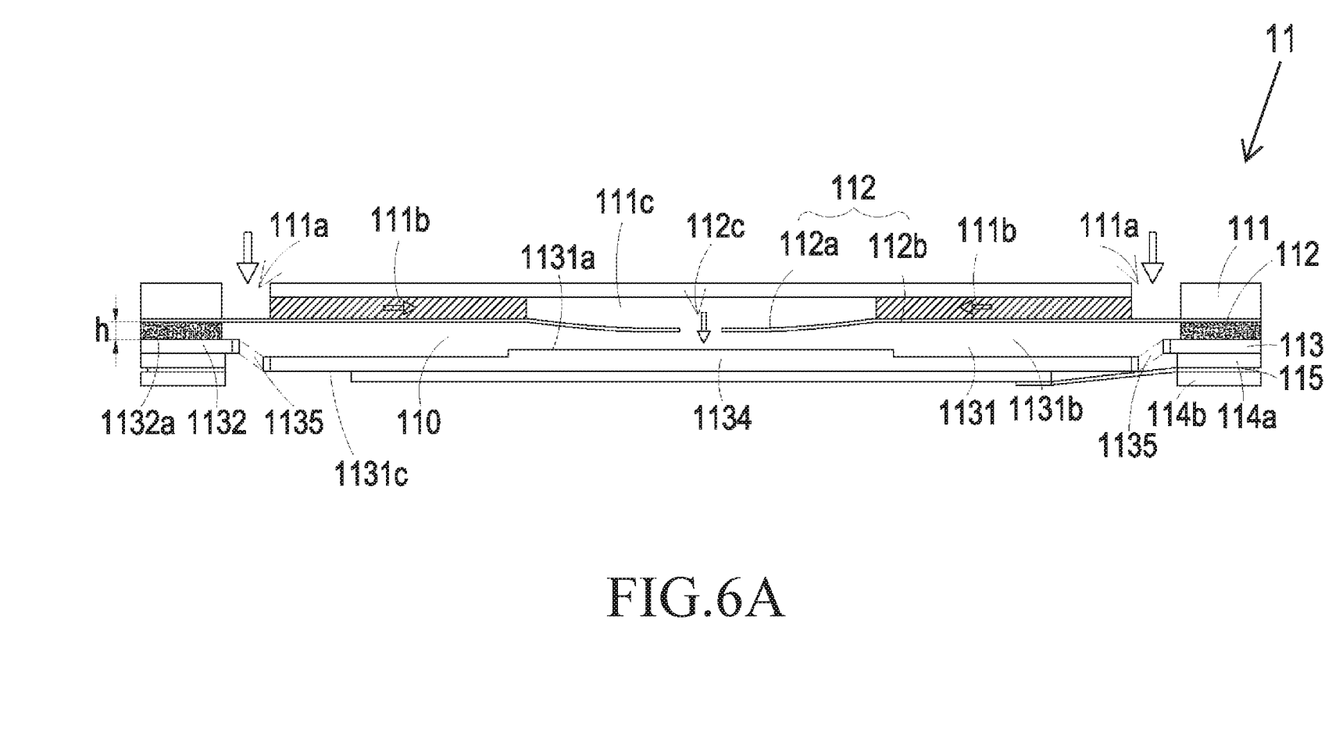
FIG. 6A and FIG. 6B illustrate schematic cross-sectional views showing the micro pump according to the exemplary embodiment of the present disclosure at different operation steps.
Figure 6B:
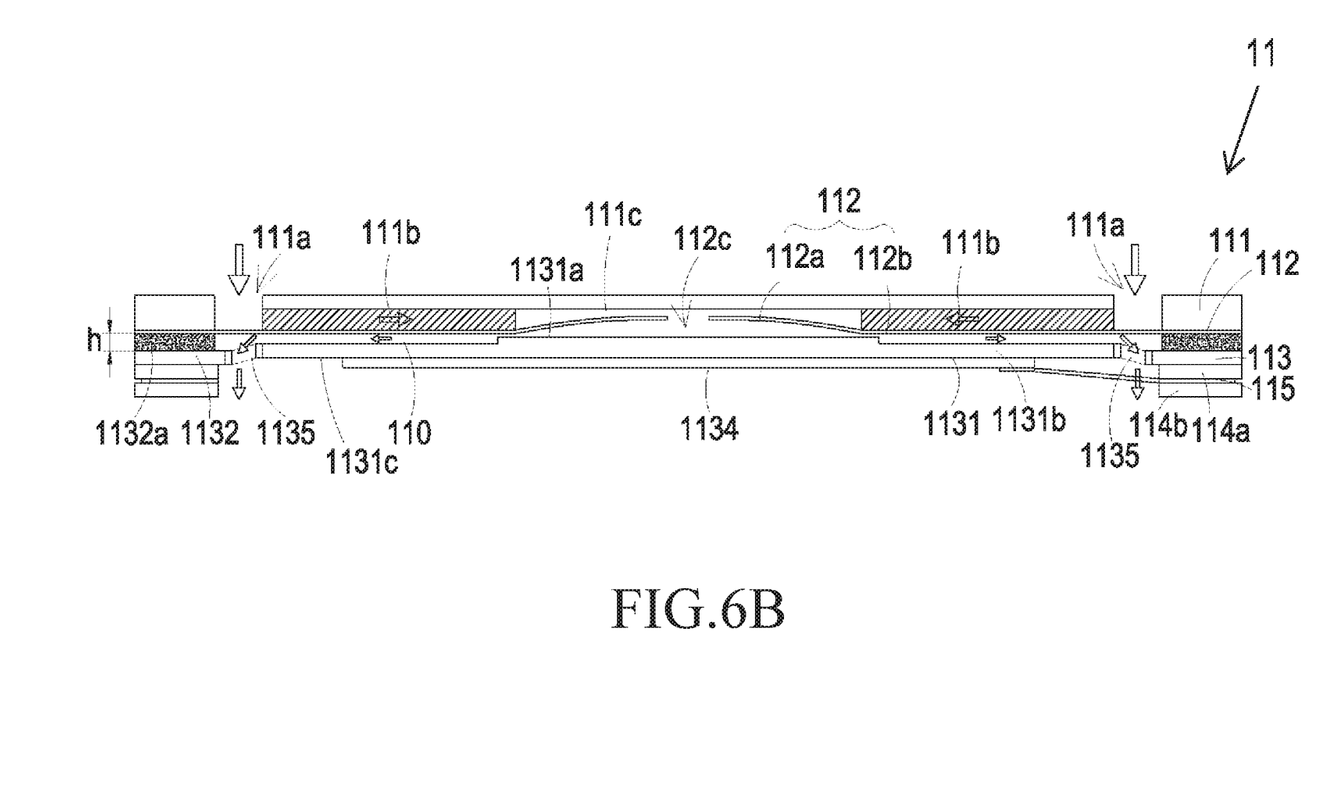

Please refer to FIG. 3A, FIG. 3B, FIG. 5, FIG. 6A, and FIG. 6B. The operation of the micro pump 11 according to one embodiment of the present disclosure is described as below. When the micro pump 11 begins to operate, the piezoelectric actuator 113 is driven by a voltage and then starts to bend and vibrate vertically and reciprocatingly by taking the supporting elements 1133 as pivots. As shown in FIG. 6A, when the piezoelectric actuator 113 is driven by a voltage and bends downwardly, since the resonance sheet 112 is a light and thin sheet, the resonance sheet 112 will perform a vertical reciprocating vibration corresponding to the piezoelectric actuator 113. That is, the portion of the resonance sheet 112 corresponding to the central recess 111c will bend and vibrate along with the piezoelectric actuator 113. Thus, the portion of the resonance sheet 112 corresponding to the central recess 111c is the movable portion 112a of the resonance sheet 112. When the piezoelectric actuator 113 bends downwardly, because of the introduction and pushing of the gas to the movable portion 112a and the driving of the piezoelectric actuator 113 by the vibration of the piezoelectric actuator 113, the movable portion 112a corresponding to the central recess 111c of the resonance sheet 112 also bends downwardly along with the piezoelectric actuator 113. Hence, the gas outside the micro pump 11 flows into the inlet plate 111 through the at least one inlet hole 111a of the inlet plate 111, and the gas is converged at the central recess 111c through the at least one convergence channel 111b. Then, the gas flows downwardly into the first chamber 110 through the perforation 112c of the resonance sheet 112 corresponding to the central recess 111c. Thereafter, since the resonance plate 112 is driven by the vibration of the piezoelectric actuator 113, the resonance plate 112 will also resonate with the piezoelectric actuator 113 and perform vertical reciprocating vibration. As shown in FIG. 6B, when the piezoelectric actuator 113 is driven to bend upwardly, the movable portion 112a of the resonance sheet 112 bends upwardly correspondingly. Therefore, the volume of the first chamber 110 can be compressed by the piezoelectric actuator 113, and the flow path of the first chamber 110 is closed. Accordingly, the gas in the first chamber 110 is pushed to flow toward the two sides of the first chamber 110, and the gas further passes through the gaps 1135 between the supporting elements 1133 of the piezoelectric actuator 113 and then flow downwardly. By having the flow path design of the micro pump 11 to generate pressure gradient in the micro pump 11, the gas can be pushed to flow in a high speed. Moreover, through the resistance difference of the gas pathway in different flow directions, the gas will be transmitted from the suction end to the discharge end, thereby achieving the gas transmission. Moreover, even in the case that the discharge end is under a pressure, the micro pump 11 can still continue to push the gas into the gas pathway, and the noise of the micro pump 11 can be reduced as well. By repeating the actions of the micro pump 11 as shown in FIG. 6A and FIG. 6B, the micro pump 11 can perform the gas transmission.

The sensor 12 may include at least one selected from a group consisting of an oxide sensor, a carbon monoxide sensor, a carbon dioxide sensor, an ozone sensor, a particle sensor, a microparticle sensor, a sulfur dioxide sensor, a nitrogen dioxide sensor, a volatile organic compounds (VOC) sensor, a bacteria sensor, a microorganism sensor, and a virus sensor. Moreover, the sensor 12 may be formed by one or more sensor units, but embodiments are not limited thereto.

To sum up, one or some embodiments of the present disclosure provides an air quality system handled by artificial intelligence internet of things. The air quality information required by the user is obtained by transmitting a digital instruction to the artificial intelligence (AI) internet of things (IoT) handling device through the user demand platform. By using self deep-learning analysis of data computing and algorithms of the AI device, different and new digital data is generated. The digital data is fed back to the plurality of micro pumps of the gas detection device through the network. Accordingly, the actuating actions of the plurality of micro pumps and the detecting actions of the plurality of sensors can be generated. Hence, the actuation and the detection of the air quality can be achieved more effectively, thereby satisfying users' requirements. The industrial value of the present application is very high, so the application is submitted in accordance with the law.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An air quality system handled by artificial intelligence (AI) internet of things (IoT), comprising:
   a gas detection device formed by arranging a plurality of micro pumps and a plurality of sensors with each other, each of the micro pumps controls and guides a gas to pass through the corresponding sensor to perform a detection to the gas so as to obtain a first digital data, wherein the gas detection device transmits out the plurality of first digital data through a network;
   an AI IoT handling device receiving and storing the plurality of first digital data transmitted by the gas detection device; and
   a user demand platform connected to the AI IoT handling device through the network, wherein the user demand platform transmits a digital instruction requiring air quality information to the AI IoT handling device;
   wherein the AI IoT handling device comprises an AI device, the AI device performs self-learning analysis to the plurality of first digital data or performs using self deep-learning analysis of data computing and algorithms of digital instruction requiring air quality information to generate a plurality of second digital data, and the plurality of second digital data is fed back to the gas detection device through the network so as to generate actuating actions of the plurality of micro pumps and detecting actions of the plurality of sensors, whereby the plurality of first digital data and the plurality of second digital data are continuously transmitted through the network and such process repeats in cycles.

2. The air quality system according to claim 1, wherein the plurality of micro pumps are arranged with each other in a parallel connection, and each of the plurality of sensors is disposed adjacent to the corresponding micro pump, so that each of the sensors of the gas detection device performs a detection to obtain a digital data.

3. The air quality system according to claim 1, wherein the plurality of micro pumps are arranged with each other in a series connection, and each of the plurality of sensors is disposed adjacent to the corresponding micro pump, so that each of the sensors of the gas detection device performs a detection to obtain a digital data.

4. The air quality system according to claim 1, wherein the plurality of micro pumps are arranged with each other in a parallel-series connection, and each of the plurality of sensors is disposed adjacent to the corresponding micro pump, so that each of the sensors of the gas detection device performs a detection to obtain a digital data.

5. The air quality system according to claim 1, wherein the gas detection device comprises at least one selected from a group consisting of an oxide sensor, a carbon monoxide sensor, a carbon dioxide sensor, an ozone sensor, a particle sensor, a microparticle sensor, a sulfur dioxide sensor, a nitrogen dioxide sensor, a volatile organic compounds (VOC) sensor, a bacteria sensor, a microorganism sensor, and a virus sensor.

6. The air quality system according to claim 1, wherein each of the plurality of micro pumps is a micro-electromechanical systems (MEMS) pump.

7. The air quality system according to claim 1, wherein each of the plurality of micro pumps is a piezoelectric pump.

8. The air quality system according to claim 7, wherein the piezoelectric pump comprises:
   an inlet plate having at least one inlet hole, at least one convergence channel, and a central recess forming a convergence chamber, wherein the at least one inlet hole is configured to introduce the gas outside the inlet plate to flow into the inlet plate, the at least one convergence channel corresponds to the at least one inlet hole, and the at least one convergence channel guides the gas flowing into the inlet plate from the at least one inlet hole to be converged at the convergence chamber formed by the central recess;
   a resonance sheet having a perforation corresponding to the convergence chamber, and a periphery of the perforation is a movable portion; and
   a piezoelectric actuator disposed corresponding to the resonance sheet;
   wherein a gap is formed between the resonance sheet and the piezoelectric actuator to form a first chamber, so that when the piezoelectric actuator is driven, the gas is guided into the inlet plate through the at least one inlet hole of the inlet plate, is converged at the central recess via the at least one convergence channel, flows through the perforation of the resonance sheet and then is transmitted to the first chamber by a resonance effect between the piezoelectric actuator and the movable portion of the resonance sheet.

9. The air quality system according to claim 8, wherein the piezoelectric actuator comprises:
   a suspension plate having a first surface and a second surface, wherein the suspension plate is capable of bending and vibrating;
   an outer frame disposed around a periphery of the suspension plate;
   at least one supporting element connected between the suspension plate and the outer frame to provide a flexible support for the suspension plate; and
   a piezoelectric sheet having a side length, wherein the side length of the piezoelectric sheet is smaller than or equal to a side length of the suspension plate, and the piezoelectric sheet is attached to the first surface of the suspension plate so as to drive the suspension plate to bend and vibrate when the piezoelectric sheet is applied with a voltage.

10. The air quality system according to claim 9, wherein the suspension plate is a square suspension plate, and the suspension plate has a protruding portion.

11. The air quality system according to claim 10, wherein the piezoelectric pump comprises: a conductive sheet, a first insulation sheet, and a second insulation sheet, wherein the inlet plate, the resonance sheet, the piezoelectric actuator, the first insulation sheet, the conductive sheet, the second insulation sheet are sequentially stacked and assembled with each other.

12. The air quality system according to claim 1, wherein the gas detection device further comprises a microprocessor and a data transmitter, wherein the microprocessor controls actuating operations of the plurality of micro pumps and the plurality of sensors, computes and converts a gas detection value sensed by the plurality of sensors into the plurality of first digital data and outputs the plurality of first digital data, and then transmits the plurality of first digital data to the data transmitter, so that the plurality of first digital data is packeted by the data transmitter and is transmitted out to the AI IoT handling device through the network.

13. The air quality system according to claim 1, wherein the network is a wired network.

14. The air quality system according to claim 12, wherein the network is a wired network.

15. The air quality system according to claim 1, wherein the network is a wireless network.

16. The air quality system according to claim 12, wherein the network is a wireless network.

* * * * *